(12) United States Patent
Meynen et al.

(10) Patent No.: US 11,243,398 B2
(45) Date of Patent: Feb. 8, 2022

(54) OPTICAL DEVICE FOR A HEAD-MOUNTED DISPLAY, AND HEAD-MOUNTED DEVICE INCORPORATING IT FOR AUGMENTED REALITY

(71) Applicant: Essilor International, Charenton-le-Pont (FR)

(72) Inventors: Mathieu Meynen, Charenton le Pont (FR); Marius Peloux, Charenton le Pont (FR); Dominick Hubacz, Charenton le Pont (FR); Ludovic Jouard, Charenton le Pont (FR); Marc Reignault, Charenton le Pont (FR)

(73) Assignee: Essilor International, Charenton-le-Pont (FR)

( * ) Notice: Subject to any disclaimer, the term of this patent is extended or adjusted under 35 U.S.C. 154(b) by 343 days.

(21) Appl. No.: 16/493,219

(22) PCT Filed: Mar. 9, 2018

(86) PCT No.: PCT/EP2018/055949
§ 371 (c)(1),
(2) Date: Sep. 11, 2019

(87) PCT Pub. No.: WO2018/166921
PCT Pub. Date: Sep. 20, 2018

(65) Prior Publication Data
US 2021/0141225 A1  May 13, 2021

(30) Foreign Application Priority Data
Mar. 13, 2017 (EP) ..................................... 17305266

(51) Int. Cl.
*G02B 27/14* (2006.01)
*G09G 5/00* (2006.01)
(Continued)

(52) U.S. Cl.
CPC ....... *G02B 27/0172* (2013.01); *G02B 27/126* (2013.01); *B82Y 20/00* (2013.01)

(58) Field of Classification Search
CPC ... G02B 27/0172; G02B 27/126; B82Y 20/00
(Continued)

(56) References Cited

U.S. PATENT DOCUMENTS 9,213,178 B1    12/2015   Giri et al.
9,568,734 B1    2/2017    Giri et al.
(Continued)

FOREIGN PATENT DOCUMENTS

WO    WO 2017/001402 A1    1/2017
WO    WO 2017/001403 A1    1/2017

OTHER PUBLICATIONS

International Search Report and Written Opinion dated May 25, 2018 in PCT/EP2018/055949 filed on Mar. 9, 2018.

*Primary Examiner* — William Choi
(74) *Attorney, Agent, or Firm* — Oblon, McClelland, Maier & Neustadt, L.L.P.

(57) ABSTRACT

The present invention relates to an optical device usable in a head-mounted display which comprises a light conducting element and at least one wafer, and to a head-mounted device which is configured to provide an informative display of augmented reality for a wearer of the head-mounted device and which comprises such an optical device. This optical device (1) comprises: a light conducting element (4) which has two first and second opposite main faces (4a and 4b) and which inputs and conducts by total internal reflections a light (6) received from the light source (5) and partially outputs it out of said element, at least one wafer (2, 3) which comprises an internal surface (2a, 3a) facing a said first main face of said light conducting element, and interposition means in contact with said first main face and said internal surface and defining a gap (11a, 11b) optically (Continued)

Figure 1:
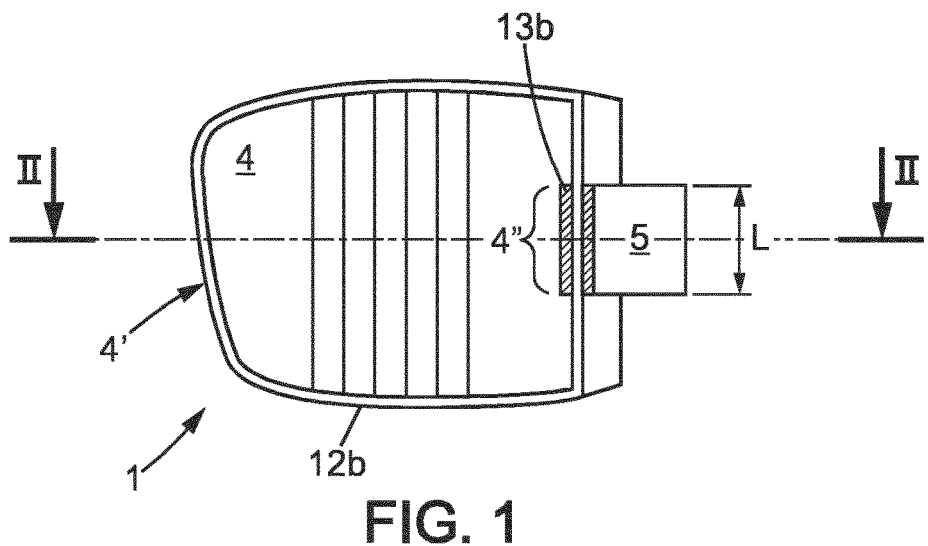

isolating said element. According to the invention, said interposition means comprise a peripheral sealing arrangement (10*a*, 10*b*) which extends along its peripheral length between and in sealing contact with a peripheral area (2*aa*, 3*aa*) of said internal surface and a facing zone (4*aa*, 4*ba*) of said first main face, at least one portion of said sealing arrangement exhibiting a locally reduced optical coupling with said first main face to preserve said internal reflections at said at least one portion toward the inside of said element.

24 Claims, 3 Drawing Sheets

(51) Int. Cl.
  *G02B 27/01* (2006.01)
  *G02B 27/12* (2006.01)
  *B82Y 20/00* (2011.01)
(58) Field of Classification Search
  USPC .............................. 359/629, 630, 638; 345/8
  See application file for complete search history.

(56) References Cited

U.S. PATENT DOCUMENTS

| | | |
|---|---|---|
| 2014/0168260 A1 | 6/2014 | O'Brien et al. |
| 2020/0096772 A1* | 3/2020 | Adema .................. G02C 7/086 |

* cited by examiner

OPTICAL DEVICE FOR A HEAD-MOUNTED DISPLAY, AND HEAD-MOUNTED DEVICE INCORPORATING IT FOR AUGMENTED REALITY

The present invention relates to an optical device particularly usable in a head-mounted display which comprises a light conducting element and at least one wafer that may be designed to form an ophthalmic lens, and to a head-mounted device which is configured to provide an informative display of augmented reality for a wearer of the head-mounted device and which comprises such an optical device. The invention particularly concerns an optical device incorporating a light conducting element which may be a light-guide optical element, although any light conducting element able to guide light waves may be usable.

A head-mounted device is an electro-optical device worn on a wearer's head. Usually, a head-mounted device is electronically controlled so as to switch between different stages or to display information to the wearer, and comprises a frame with electronically controlled ophthalmic lenses. Basically, a head-mounted device may comprise a see-around or see-through mechanism, and may be used in an immersive pattern (i.e. cutting off the field of outside view) or in a non-immersive pattern (i.e. allowing the wearer to interact with his environment). In particular, head-mounted displays (HMDs) of the see-through type are capable of superimposing information, for example computer generated information (e.g. texts and/or images), over a real-world view. Such see-through HMDs are used in particular for providing an augmented reality to the wearer.

HMDs usually include an optical device which may comprise two wafers and a display unit having in succession a light source, a collimating module and a light conducting element, such as a light-guide optical element (LOE). As commonly known, a LOE is configured to trap the emitted light waves by total internal reflections from its external main faces, and to output a light towards an eye of the wearer. The wafers are typically attached to the main faces of the LOE, in such a way that their attachment does not degrade the total reflections of the light waves inside the LOE, nor the coupling of the light waves into and out from the LOE.

WO 2016/075689 A1 teaches to use for this attachment a nanostructured air gap film, such as a moth-eye film, which is cemented to the corresponding wafer and exhibits tapered nanoreliefs adhesively attached to a main face of the LOE, so that the air gap film which is interposed between each wafer and the LOE defines an abrupt change of refractive index at an interface plane with this main face, which allows to preserve the total internal reflections of the light waves inside the LOE.

A major drawback of these interposition means between each wafer and the LOE disclosed in this document resides in the fact that each air gap film must cover the whole area of the corresponding main face of the LOE, and that this film may not be sufficiently water- and dust-proof.

As a variant, it is also known to encapsulate the LOE by an adhesive or molding means, which remedies this drawback of insufficient tightness to water and dust. Nonetheless, a major drawback of this encapsulation of the LOE resides in an additional isolating treatment of the LOE main faces which is required to preserve total internal reflections of the light waves inside the LOE.

One purpose of the present invention is to provide an optical device particularly usable in a head-mounted display which remedies the aforementioned drawbacks, the optical device comprising:

a light conducting element having a first refractive index which has an input zone coupled to a light source and two first and second opposite main faces and which is configured to input and conduct by total internal reflections between said main faces a light received from said light source and to partially output the conducted light out of said light conducting element, at least one wafer which comprises an internal surface facing a said first main face of said light conducting element, and interposition means which are in contact with said first main face and said internal surface and which define therebetween a gap having a gap refractive index lower than said first refractive index and optically isolating said light conducting element.

For this purpose, said interposition means comprise—advantageously consist of—a peripheral sealing arrangement which has a peripheral length and extends along said peripheral length between and in sealing contact with a peripheral area of said internal surface and a zone of said first main face facing said peripheral area, at least one portion of said sealing arrangement along said peripheral length being configured to exhibit a locally reduced optical coupling with said first main face compared to the remaining of said peripheral length, to preserve said internal reflections at said at least one portion inside the light conducting element.

It is to be noted that these interpositions means of the invention, which advantageously are only peripheral, differ from the attached air gap film of WO 2016/075689 A1 which continuously covers the entire areas of the facing surfaces of the light conducting element and of the wafer, this air gap film filling most of the space between each wafer and the light conducting element.

It will also be noted that said gap of the invention which is defined by a free space inside said peripheral sealing arrangement has an isolating function which allows the total internal reflections of the light waves within the light conducting element.

It will further be noted that this peripheral sealing arrangement forms an effective sealing barrier against the penetration of water and dust between said at least one wafer and the light conducting element in use which, combined to the global transparency of the whole device, allows to preserve the quality of the output light from any degradation resulting from the environment. The sealing thus obtained advantageously differs from that obtained by the known encapsulation mentioned above of the light conducting element which required a multilayer isolating treatment of the main faces thereof, since the sealing of the invention allows to do without this isolating treatment.

As explained below, it will still further be noted that this peripheral sealing arrangement which may exclusively form said interposition means not only provides this sealing between the or each wafer and the light conducting element, but also allows to provide for a prescription for the optical device by designing said or each wafer so as to form an ophthalmic lens whose surfaces are designed for a correction of vision, upon prescription data.

Advantageously, said gap may preferably be filled with air and have a thickness which is greater than or equal to an emitting wavelength of said light source, and which may be of at least 700 nm and preferably of at least 1 µm.

As explained above, such an air gap acts as an isolator with respect to the light conducting element, by preserving total reflections therein and eventually allowing to obtain by transmission the output informative light or image.

It is to be noted that this air gap allows to provide for said prescription while improving this transmission and also enhancing the visual esthetical aspect of the optical device, compared to the above-mentioned known multilayer isolator.

According to another feature of the invention, said peripheral sealing arrangement may comprise at least one elastomeric or plastic peripheral seal extending over said peripheral length in the form of a closed or open loop and may further incorporate, on said at least one portion, optically isolating means which are configured for exhibiting said reduced optical coupling and which are in contact with said at least one peripheral seal and with said first main face.

Also advantageously, said at least one portion may include a proximal section of said peripheral sealing arrangement which faces said input zone of said light conducting element adjacent said light source.

It is to be noted that the input zone of the light conducting element which is coupled to the light source (e.g. a microdisplay projector, known as POD) embedded into a frame thereof and forming said light source, is critical for the quality of the output light and resulting image in the case of a HMD, and that this proximal section which is immediately adjacent and faces this input zone advantageously incorporates said optically isolating means, so that no degradation of the resulting output image is observed due to the negative influence of said seal at this input zone.

According to another feature of the invention, said at least one peripheral seal is adapted to prevent intrusion of water and dust into said gap, and may be selected from:
  rubber seals having a polygonal or elliptic cross-section which is preferably square or circular, and
  multilayer thermoplastic adhesive seals optionally containing microbeads and preferably comprising two adhesive outer layers which are for example pressure sensitive layers and which are provided on either side of an inner layer, which is for example of triacetyl cellulose.

According to still another feature of the invention, said optically isolating means may be selected from:
  (i) a nanostructured film having nanoreliefs able to define an abrupt change of refractive index at an interface between said film and said first main face,
  (ii) a monolayer or multilayer mirror film able to reflect the light coupled out from said first main face and exhibiting a contact area with said first main face,
  (iii) A sealing member devoid of contact with said first main face and mounted in contact with said light source and with a peripheral edge of said at least one wafer, said light source being connected to said light conducting element on a connecting zone thereof, said sealing member locally replacing and being connected to said peripheral seal in an opening defined by said open loop, and/or
  (iv) a flexible gasket compressed between said first main face and said internal surface and exhibiting a contact area with said first main face,
  said contact area being defined in cases (ii) and (iv) by a length of said at least one portion in a peripheral direction thereof and, in a transverse direction perpendicular to said length, by a width of said at least one portion in contact with said first main face.

Advantageously, said peripheral sealing arrangement may be in non-adhesive contact with said internal surface of said at least one wafer and with said first face of said light conducting element, and said optically isolating means may be in adhesive or non-adhesive contact with said at least one peripheral seal.

According to a first embodiment of the invention relating to case (i) above, said optically isolating means comprise said nanostructured film which is a moth eye film defined by said nanoreliefs which are each tapered from a base to an end thereof, for example in a substantially conical way, and which exhibit an actual refractive index seen by the incoming light which continuously decreases from said bases to said ends, said nanostructured film being adhesively bonded to said at least one peripheral seal and being preferably in contact with said first main face by said ends of said tapered nanoreliefs.

According to a second embodiment of the invention relating to case (ii) above, said optically isolating means comprise said monolayer or multilayer mirror film which is deposited on said first main face for example by physical vapor deposition of an aluminum layer or of a reflecting ink, and which has said width in contact with said first main face that is preferably less than 200 μm.

According to a third embodiment of the invention relating to case (iii) above, said sealing member may for instance comprise:
  a sealing body in contact with said peripheral edge, and a sealing lip extending said sealing body and in contact with said light source, or
  a connecting element which is bonded to an area of said connecting zone surrounding said light source and which defines two protruding opposed surfaces provided with two local seals respectively in contact with said peripheral edge and with said light source.

According to a fourth embodiment of the invention relating to case (iv) above, said optically isolating means comprise said compressed flexible gasket which has said width in contact with said first main face that is less than 200 μm and preferably of between 30 μm and 200 μm.

According to another feature of the invention, the optical device may comprise at least one pair of first and second said wafers which respectively have first and second said internal surfaces facing said first and second main faces of said light conducting element, the optical device comprising:
  a first said peripheral sealing arrangement between and preferably in non-adhesive contact with a first said peripheral area of said first internal surface and with a first said zone of said first main face facing said first peripheral area, and/or
  a second said peripheral sealing arrangement between and preferably in non-adhesive contact with a second said peripheral area of said second internal surface and with a second said zone of said second main face facing said second peripheral area.

Advantageously, said at least one pair of said first and second wafers may be respectively designed to form:
  a front ophthalmic lens which preferably has said first internal surface which is plane and a first opposite external surface which is convex, and
  a back ophthalmic lens proximal to the wearer's eye which preferably has said second internal surface which is plane and a second opposite external surface,
  said at least one pair of said first and second wafers being adapted to impart given prescription data to said optical device via an optical correction provided by said lenses, including optical power, astigmatism and/or addition.

According to another aspect of the invention, said light conducting element, which is preferably a light-guide optical element (LOE), may be configured to provide:
- an informative display of augmented reality by said head-mounted display, said light conducting element partially outputting the conducted light towards an eye of a wearer through said at least one wafer, or
- a lighting or measurement.

Accordingly, said light conducting element usable in the device of the invention may be other than a LOE, for example such as those used in systems designed by the Magic Leap company (which are HMDs able to display informative images), or even wave guides designed for applications other than imaging.

A head-mounted device according to the present invention is configured to provide an informative display of augmented reality for a wearer, and this head-mounted device is characterized in that it comprises an optical device as defined above, the head-mounted device preferably comprising a microdisplay projector (POD) embedded into a frame thereof and forming said light source to which said light conducting element is coupled.

Advantageously, the head-mounted device may be adapted to a wearer's ophthalmic data and more preferably to a wearer's prescription data including optical power, astigmatism and/or addition, by means of at least one pair of two first and second said wafers forming ophthalmic lenses with an optical correction arranged on either side of said light conducting element and separated therefrom, preferably with non-adhesive contact, by a first said peripheral sealing arrangement and by a second said peripheral sealing arrangement.

It is to be noted that the non-adhesive contact allows to provide a variable prescription on informative HMDs incorporating a given LOE, such as informative see-through glasses having at least one zone of total internal reflections at the periphery of the corrective lenses, since the peripheral sealing arrangement of the interposition means of the invention may in this case be easily removed from the optical device to be incorporated to another device comprising other wafers forming different prescription lenses.

Specifically, doing without any adhesive there meets the current need to customize HMDs to a wearer's or group of wearers' viewing ability, in order for him to see the real world through it by appropriate corrective ophthalmic lenses (or a response to other visual needs such a light attenuation, color perception, etc).

In a known way, a wearer's prescription is a set of optical characteristics of optical power, of astigmatism and/or of addition, determined by an ophthalmologist in order to correct the vision defects of the wearer, for example by means of a lens positioned in front of his eye. For example, the prescription for a progressive addition lens comprises values of optical power and of astigmatism at the distance-vision point and, where appropriate, an addition value.

The following definitions are provided below to describe the present invention.

"Head-mounted display devices" (HMD) are knowingly to be worn on or about the head of a wearer, including helmet-mounted displays, optical head-mounted displays, head-worn displays and the like. They include optical means for displaying an image for visualization by the wearer. The HMD may provide for the superimposed visualization of a computer-generated image and of a 'real-life' vision field. The HMD may be monocular (single eye) or binocular (both eyes). The HMD of the invention can take various forms, including eyeglasses, masks such as skiing or diving masks, goggles, etc. The HMD may comprise one or more lenses. Said lenses can be selected from ophthalmic lenses, such as prescription lenses. In preferred embodiments, the HMD is a pair of eyeglasses provided with lenses.

"Computer-generated images" knowingly comprise 2D- or 3D-diffraction images, 2D- or 3D-computer-generated holographic images, any amplitude images etc. Computer-generated images may be used as virtual images. In some embodiments, the images (data) can be calculated in order to correct at least partially optical aberrations such as the fixed aberrations of the display (natural aberrations or linked to its orientation or position in front of a diffractive mirror), and the aberrations of the diffractive mirror used with this orientation or position of the display.

"Image sources" (IS) are knowingly any light source that can emit a light beam suitable (arranged, configured) for displaying the image for visualization by the wearer. Visualization occurs after the illumination beam stemming from the image source is reflected onto the see-through mirror. Regarding display of holographic images, the light beam comprises the reference beam for the hologram. The image can be displayed from image data (for example computer-generated image data). The IS may have a multi stack structure and may be "off-axis", in that it may be located next to the temple of the wearer, for example on the temple component of the HMD, such as a temple component of spectacles. The IS may be any image source configured for the display of virtual images (computer-generated images). It may be a screen (for example OLED, LCD, LCOS, etc.), a phase and/or amplitude SLM (Spatial Light Modulator) taken in combination with its light source (for example laser, diode laser, etc.), a projector such as a picoprojector (MEMS or DLP, that may use LEDs, diodes lasers, etc.), or any other source. The IS may also include any other image source (computer-generated image source), and/or control electronics and/or power supply and/or optional optical elements, etc.

"Wearer ophthalmic data" or "ophthalmic data" (OD) knowingly include wearer prescription data (PD), wearer eye sensitivity data (SD) and wearer ophthalmic biometry data (BD), and generally data pertaining to any wearer vision defect, including for example data pertaining to chromatic aberrations, lack of eye lens (aphakia), etc.

"Prescription data" (PD) knowingly refer to one or more data obtained for the wearer and indicating for each eye a prescribed far vision mean refractive power $P_{FV}$, and/or a prescribed astigmatism value $CYL_{FV}$ and/or a prescribed astigmatism axis $AXE_{FV}$ and/or a prescribed addition A suitable for correcting the ametropia and/or presbyopia of each eye. The mean refractive power $P_{FV}$ is obtained by summing the half value of the prescribed astigmatism value $CYL_{FV}$ to the prescribed sphere value $SPH_{FV}$: $P_{FV}=SPH_{FV}+CYL_{FV}/2$. Then, the mean refractive power for each eye for proximate (near) vision is obtained by summing the prescribed addition A to the far vision mean refractive power $P_{FV}$ prescribed for the same eye: $P_{NV}=P_{FV}+A$. In the case of a prescription for progressive lenses, prescription data comprise wearer data indicating for each eye values for $SPH_{FV}$, $CYL_{FV}$, A and the astigmatism axis $AXE_{FV}$. In preferred embodiments, wearer prescription data PD are selected from astigmatism module, astigmatism axis, power, prism and addition, and more generally any data indicating the correction of any given vision defect. Such defect may result from a partial retinal detachment, retina or iris or cornea malformation.

Figure 2:
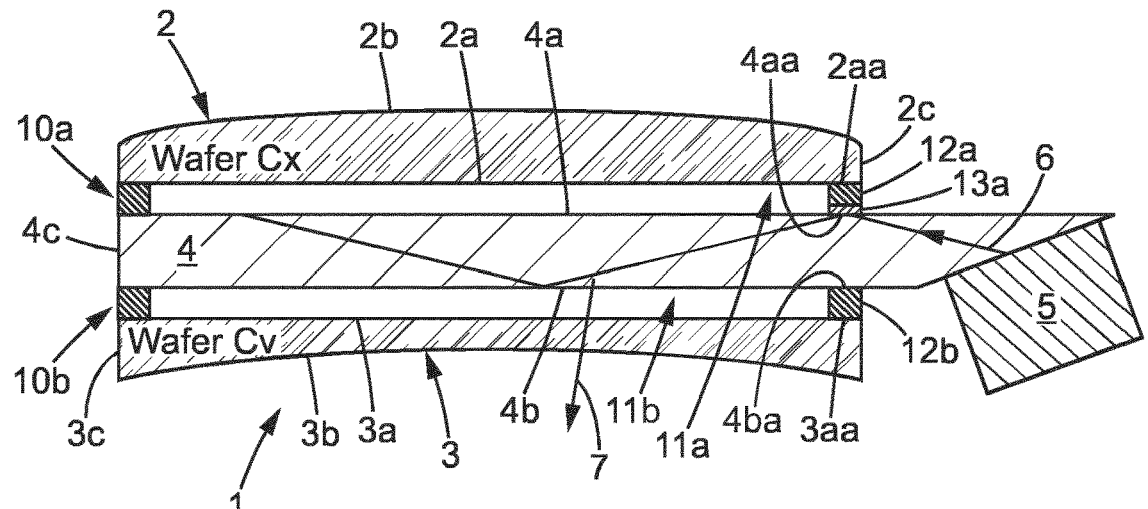
Figure 3:
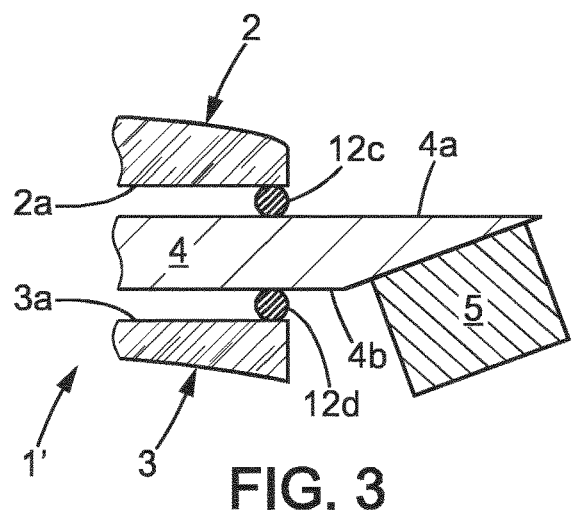
Figure 4:
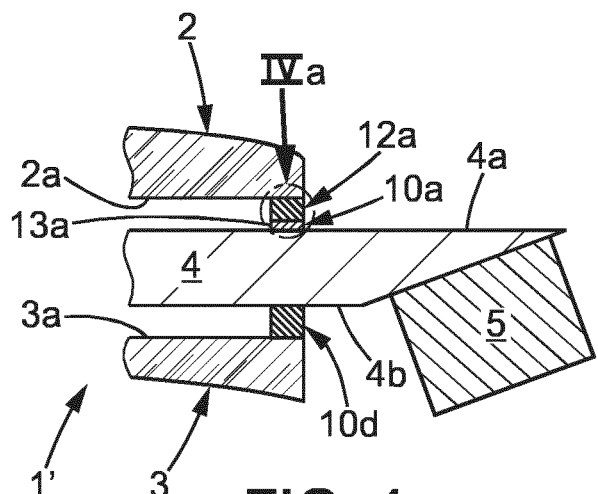
Figure 4A:
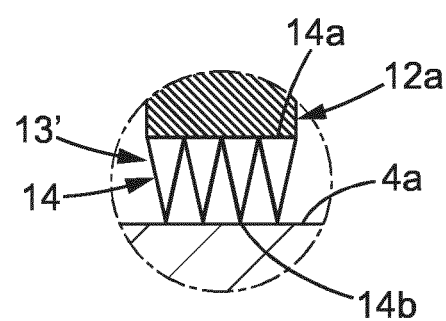
Figure 5:
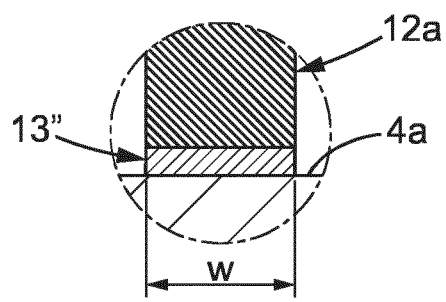
Figure 6:
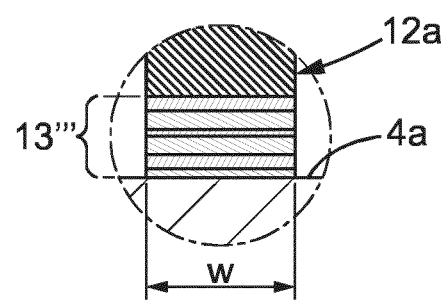
Figure 7:
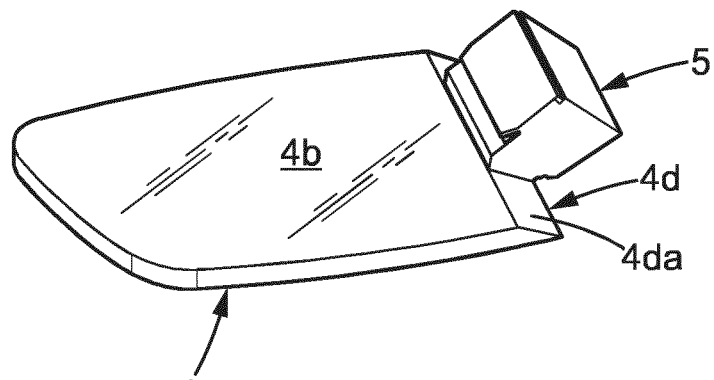
Figure 8:
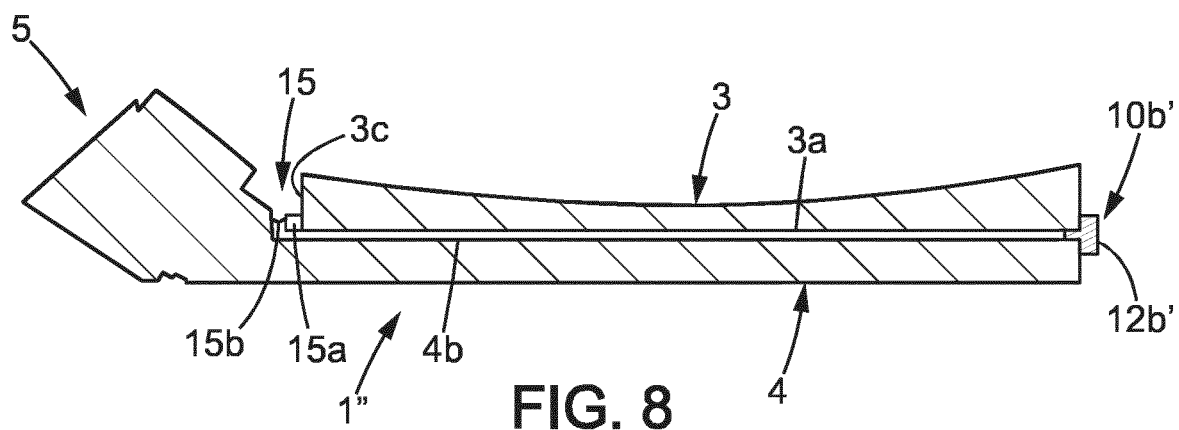
Figure 9:
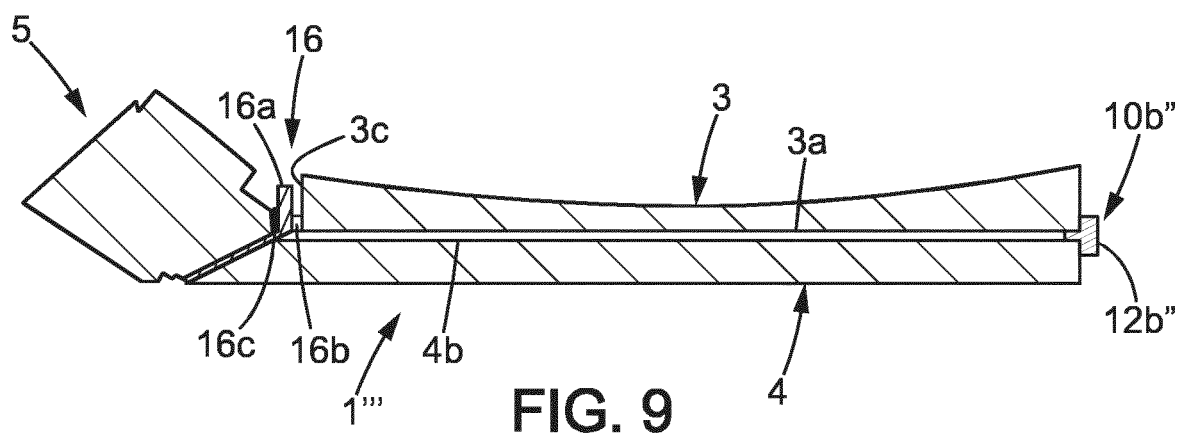

The above-mentioned characteristics of the present invention, along with others, will be understood more clearly on reading the following description of several examples of the invention, which are given for illustrative purposes and are not intended to limit the invention, said description referring to the attached drawings, wherein:

FIG. 1 is a bottom diagrammatic plan view of an optical device according to the invention as visible in FIG. 2, FIG. 2 is a diagrammatic cross-sectional view of an optical device of the invention according to FIG. 1 taken along the II-II section line thereof, FIG. 3 is a diagrammatic partial cross-sectional view detailing an edge zone of another optical device of the invention similar to FIG. 2, FIG. 4 is a diagrammatic partial cross-sectional view detailing an edge zone of the optical device of FIG. 2, FIG. 4a is a diagrammatic partial cross-sectional view showing on a greater scale each peripheral sealing arrangement and the light conducting element of the optical device of FIG. 2 according to the first embodiment of the invention, FIG. 5 is a diagrammatic partial cross-sectional view showing on a greater scale each peripheral sealing arrangement and the light conducting element of FIG. 2 according to the second embodiment of the invention, FIG. 6 is a diagrammatic partial cross-sectional view showing on a greater scale each peripheral sealing arrangement and the light conducting element of FIG. 2 according to a variant of this second embodiment of the invention, FIG. 7 is a diagrammatic perspective view showing an exemplary combination of a light conducting element provided with a light source, said combination being usable in an optical device of the invention, FIG. 8 is diagrammatic cross-sectional view of another optical device of the invention including the combination of FIG. 7 and a wafer provided with a peripheral sealing arrangement according to the third embodiment of the invention, and FIG. 9 is diagrammatic cross-sectional view of still another optical device of the invention including the combination of FIG. 7 and a wafer provided with a peripheral sealing arrangement according to a variant of this third embodiment of the invention.

The optical devices 1, 1' visible in FIGS. 1-4 each comprise first and second wafers 2 and 3 which are respectively designed to form a front ophthalmic lens (distal to the wearer's eye) and a back ophthalmic lens (proximal to the wearer's eye), and which respectively have first and second plane internal surfaces 2a and 3a (see FIGS. 2-4) facing first and second main faces 4a and 4b of a light conducting element 4. The element 4, for instance of the LOE type, is designed to trap the light waves emitted by a light source 5, such as a microdisplay projector (POD) for example embedded into a frame of a head-mounted device (e.g. a HMD) incorporating the optical device 1, 1'. As visible in FIG. 2, the emitted light beams 6 are successively reflected by a total internal reflection mechanism from inner sides of the main faces 4a and 4b of the element 4, except at some specific predetermined locations where these reflected beams are eventually transmitted as an output light 7 at a specific angle out of the second main face 4b toward the second wafer 3, until they reach the eye of the wearer of the head-mounted device.

The optical device 1, 1' comprises:
  a first peripheral sealing arrangement 10a between and preferably in non-adhesive contact with a first peripheral area 2aa of the first internal surface 2a and with a first peripheral zone 4aa of the first main face 4a facing the first peripheral area 2aa, and
  a second peripheral sealing arrangement 10b between and preferably in non-adhesive contact with a second peripheral area 3aa of the second internal surface 3a and with a second peripheral zone 4ba of the second main face 4b facing the second peripheral area.

As visible in FIG. 2, the first wafer 2 has a first external surface 2b (opposite the first plane internal surface 2a) which is convex, and the second wafer 3 has a second external surface 3b (opposite the second plane internal surface 3a) which is concave in this exemplary embodiment (although this second external surface 3b may be convex, progressive or designed for correcting astigmatism, for example). As explained above, the optical devices 1, 1' of FIGS. 1-6 are configured to provide given prescriptions to informative glasses such as those of a head-mounted device via an optical correction provided by said lenses including for example optical power, astigmatism and/or addition.

As particularly visible in FIGS. 1 and 2, two first and second peripheral sealing arrangements 10a and 10b are respectively interposed between and in contact with the first main face 4a and the first internal surface 2a and with the second main face 4b and the second internal surface 3a, while defining therebetween an air gap 11a, 11b (or more generally a gap of a medium having a refractive index lower than that of the light conducting element). This gap 11a, 11b allows to optically isolate the element 4. The sealing arrangement 10a, 10b extends along its peripheral length in contact with the peripheral area 2aa, 3aa (immediately adjacent a peripheral edge 2c, 3c of the wafer 2, 3) and with the facing peripheral zone 4aa, 4ba (adjacent a peripheral edge 4c of the element 4).

According to this exemplary embodiment of the invention, the peripheral sealing arrangements 10a, 10b each comprise:
  an elastomeric or plastic peripheral seal 12a, 12b which continuously extends in the form of a closed loop (see FIG. 1) in contact with the corresponding internal surface 2a, 3a and a majority length portion 4' (visible in FIG. 1) of the peripheral zone 4aa, 4ba, which seal 12a, 12b is adapted to prevent intrusion of water and dust into the gap 11a, 11b, and
  optically isolating means 13a, 13b which are mounted in contact with a short section of the peripheral seal 12a, 12b and with a minority length portion 4" (see FIG. 1) of the peripheral zone 4aa, 4ba and which are configured for locally exhibiting a reduced optical coupling compared to the majority length portion 4', to preserve the total internal reflections toward the inside of the main faces 4a, 4b so that no light beams escape from the element 4 at this section.

As shown by FIG. 1, the section of the seal 12a, 12b equipped with the optically isolating means 13a, 13b defines this short portion of the sealing arrangement 10a, 10b which faces at least an input zone of the light conducting element 4 adjacently coupled to the light source 5. Since the input zone is critical for the quality of the light 7 output from the element 4, the isolating means 13a, 13b which locally replace in part the peripheral seal 12a, 12b allow to avoid a degradation of the resulting output image for the HMD which could have arisen from the interposition of the seal 12a, 12b at this input zone, thanks to this locally reduced optical coupling with the main face 4a, 4b compared to the remaining of the sealing arrangement 10a, 10b devoid of the isolating means 13a, 13b.

The seals 12a, 12b shown in FIG. 2 each have a square cross-section, although they may have any other geometry defined by a closed broken line, such as a polygonal (e.g. rectangular) cross-section.

The seals 12c, 12d shown in FIG. 3 each have a circular cross-section, although they may have any other geometry defined by a closed curved line, such as an elliptic, oblong, monolobe or multilobe cross-section. This curved geometry may in this case impart a convex (e.g. round) shape to the seal 12c, 12d, for example substantially toroidal.

The seals 12a, 12b and 12c, 12d visible in FIGS. 1-6 may be made of a material selected from rubbers and multilayer thermoplastic adhesives optionally containing microbeads and preferably comprising two adhesive outer layers which are for example pressure sensitive layers such as a sandwich PSA/TAC/PSA (where PSA is a pressure sensitive adhesive and TAC is triacetyl cellulose).

The optically isolating means visible in FIG. 4a consist of a nanostructured film 13' for example adhesively bonded to the seal 12a, 12b and having nanoreliefs 14 defining an abrupt change of refractive index at the interface between the film 13' and the main face 4a, 4b. The film 13' is preferably of the moth eye type (such as a Mosmite® film from Mitsubishi Rayon) and has those nanoreliefs 14 which are tapered in a conical way from their bases 14a to their ends 14b in contact with the main face 4a, 4b. The film 13' thus exhibits an actual refractive index which continuously decreases from the bases 14a to the ends 14b.

The optically isolating means visible in FIGS. 5 and 6 are in each embodiment attached to the seal 12a, 12b and to the light conducting element 4, and they both consist of a mirror film 13" and 13'" able to reflect the light 6 coupled out from the main face 4a, 4b. The mirror film 13", 13'" exhibits a contact area with the main face 4a, 4b which is defined by a film length L in a peripheral direction (L being the length of the minority portion 4" in FIG. 1) and a film width W in a transverse direction (see FIGS. 5-6). This film width W is less than 200 µm and preferably of between 30 µm and 200 µm. In both cases, the mirror film 13", 13'" may be deposited onto the main face 4a, 4b by a vacuum deposition method (e.g. by physical vapor deposition).

Specifically, the mirror film 13" of FIG. 5 consist of a monolayer film for example made up of an aluminum layer or a reflecting ink, and the mirror film 13'" of FIG. 6 consists of a multilayer film obtained by successive treatment steps for example implemented by vacuum deposition.

FIGS. 8 and 9, which each refer to FIG. 7 showing a light conducting element 4 (such as a LOE) provided with a light source 5 (such as a POD), illustrate a peripheral sealing arrangement 10b', 10b" equipping a wafer 3 according to the third above-mentioned embodiment of the invention. Specifically, the light source 5 is fixed in FIG. 7 to an oblique surface in the form of a beveled edge 4d extending from a main face 4b of the light conducting element 4 and defining a connecting zone 4d between the element 4 and the light source 5.

As visible in each exemplary optical device 1", 1'" of FIGS. 8-9, the optically isolating means consist of an additional sealing member 15, 16 devoid of contact with the main face 4b, being removably (i.e. detachably) mounted in contact with the light source 5 and the peripheral edge 3c of the wafer 3. This sealing member 15, 16 is mounted locally in replacement of the peripheral seal 12b', 12b" which extends in the form of an open loop (i.e. so seal 12b', 12b" is present in the opening of this loop). Specifically, the following two embodiments of the invention may be contemplated in FIGS. 8-9 for the arrangement 10b', 10b", wherein the sealing member (for example 15) and the peripheral seal (for example 12b') may be composed of:

a single piece having for instance different sections which locally differ from one another, or of two or more different pieces.

In the alternative embodiment of FIG. 8, the sealing member 15 comprises a sealing body 15a in contact with the peripheral edge 3c, and a flexible sealing lip 15b extending the sealing body 15a and in contact with the light source 5.

In the alternative of FIG. 9, the sealing member 16 comprises a connecting element 16a which is bonded to an area 4da of the connecting zone 4d surrounding the light source 5 and which protrudes from this connection zone 4d between and in front of the light source 5 and the wafer 3. The element 16a is provided on one side thereof with a first local seal 16b in contact with the peripheral edge 3c (the first seal 16b may be made of a usual lip seal), and on the other side thereof with a second local seal 16c in contact with the light source 5 (the second seal 16c may be made of a silicone adhesive, for instance). This connecting element 16a, which forms an intermediate insert, may thus be fixed thanks to the beveled edge 4d of the light conducting element 4 and may constitute the very frame of a head-mounted device or a part of such a frame. Besides, the sealing between the edge 3c of the wafer 3 and the connecting element 16a may be achieved along a plane, which allows to control the position of the wafer 3 during its centering in the mounting process of the optical device 1'".

Both alternatives of FIGS. 8 and 9 advantageously allow not to press onto sensitive zones of the light conducting element 4, and also not to generate too much stresses between the element 4 and the attached light source 5.

The invention claimed is:

1. An optical device in a head-mounted display, the optical device comprising:
   a light conducting element having a first refractive index which has an input zone coupled to a light source and two first and second opposite main faces and which is configured to input and conduct by total internal reflections between said main faces a light received from said light source and to partially output the conducted light out of said light conducting element,
   at least one wafer which comprises an internal surface facing a said first main face of said light conducting element, and
   interposition means which are in contact with said first main face and said internal surface and which define therebetween a gap having a gap refractive index lower than said first refractive index and optically isolating said light conducting element,
   wherein said interposition means comprise a peripheral sealing arrangement which has a peripheral length and extends along said peripheral length between and in sealing contact with a peripheral area of said internal surface and a zone of said first main face facing said peripheral area, at least one portion of said sealing arrangement along said peripheral length being configured to exhibit a locally reduced optical coupling with said first main face compared to the remaining of said peripheral length, to preserve said internal reflections at said at least one portion inside said light conducting element.

2. The optical device according to claim 1, wherein said peripheral sealing arrangement comprises at least one elastomeric or plastic peripheral seal extending over said peripheral length in the form of a closed or open loop and further incorporates, on said at least one portion, optically isolating means which are configured for exhibiting said reduced optical coupling and which are in contact with said at least one peripheral seal and with said first main face.

3. The optical device according to claim 2, wherein said peripheral sealing arrangement is in non-adhesive contact with said internal surface of said at least one wafer and with said first face of said light conducting element, and wherein said optically isolating means are in adhesive or non-adhesive contact with said at least one peripheral seal.

4. The optical device according to claim 2, wherein said at least one peripheral seal is adapted to prevent intrusion of water and dust into said gap, and is selected from:
rubber seals having a polygonal or elliptic cross-section, and
multilayer thermoplastic adhesive seals optionally containing microbeads.

5. The optical device according to claim 4, wherein said at least one peripheral seal is selected from:
rubber seals having a square or circular cross-section, and
multilayer thermoplastic adhesive seals comprising two adhesive outer layers which are pressure sensitive layers and which are provided on either side of an inner layer which is of triacetyl cellulose.

6. The optical device according to claim 2, wherein said optically isolating means are selected from:
(i) a nanostructured film having nanoreliefs able to define an abrupt change of refractive index at an interface between said film and said first main face,
(ii) a monolayer or multilayer mirror film able to reflect the light coupled out from said first main face and exhibiting a contact area with said first main face,
(iii) a sealing member devoid of contact with said first main face and mounted in contact with said light source and with a peripheral edge of said at least one wafer, said light source being connected to said light conducting element on a connecting zone thereof, said sealing member locally replacing and being connected to said peripheral seal in an opening defined by said open loop, and/or
(iv) a flexible gasket compressed between said first main face and said internal surface and exhibiting a contact area with said first main face,
said contact area being defined by a length of said at least one portion in a peripheral direction thereof and, in a transverse direction perpendicular to said length, by a width of said at least one portion in contact with said first main face.

7. The optical device according to claim 6, wherein said optically isolating means comprise said nanostructured film which is a moth eye film defined by said nanoreliefs which are each tapered from a base to an end thereof, and which exhibit an actual refractive index seen by the incoming light which continuously decreases from said bases to said ends, said nanostructured film being adhesively bonded to said at least one peripheral seal.

8. The optical device according to claim 7, wherein said nanoreliefs are each tapered from the base to the end thereof in a substantially conical way, said nanostructured film being in contact with said first main face by said ends of said tapered nanoreliefs.

9. The optical device according to claim 6, wherein said optically isolating means comprise said monolayer or multilayer mirror film which is deposited on said first main face.

10. The optical device according to claim 9, wherein said monolayer or multilayer mirror film is deposited on said first main face by physical vapor deposition of an aluminum layer or of a reflecting ink, and has said width in contact with said first main face that is less than 200 µm.

11. The optical device according to claim 6, wherein said optically isolating means comprise said compressed flexible gasket which has said width in contact with said first main face that is less than 200 µm.

12. The optical device according to claim 6, wherein said sealing member comprises:
a sealing body in contact with said peripheral edge, and a sealing lip extending said sealing body and in contact with said light source, or
a connecting element which is bonded to an area of said connecting zone surrounding said light source and which defines two protruding opposed surfaces provided with two local seals respectively in contact with said peripheral edge and with said light source.

13. The optical device according to claim 1, wherein said gap has a thickness which is greater than or equal to an emitting wavelength of said light source, and which is of at least 700 nm.

14. The optical device according to claim 13, wherein said gap is filled with air and has said thickness greater than or equal to an emitting wavelength of said light source which is of at least 1 µm.

15. The optical device according to claim 1, wherein said at least one portion includes a proximal section of said peripheral sealing arrangement which faces said input zone of said light conducting element adjacent said light source.

16. The optical device according to claim 1, wherein said light conducting element, is configured to provide:
an informative display of augmented reality by said head-mounted display, said light conducting element partially outputting the conducted light towards an eye of a wearer through said at least one wafer, or a lighting or measurement.

17. The optical device according to claim 16, wherein said light conducting element is a light-guide optical element (LOE).

18. The optical device according to claim 1, wherein the optical device comprises at least one pair of first and second said wafers which respectively have first and second said internal surfaces facing said first and second main faces of said light conducting element, the optical device comprising:
a first said peripheral sealing arrangement between a first said peripheral area of said first internal surface and with a first said zone of said first main face facing said first peripheral area, and/or
a second said peripheral sealing arrangement a second said peripheral area of said second internal surface and with a second said zone of said second main face facing said second peripheral area.

19. The optical device according to claim 18, wherein said at least one pair of said first and second wafers are respectively designed to form:
a front ophthalmic lens which preferably has said first internal surface which is plane and a first opposite external surface which is convex, and
a back ophthalmic lens proximal to the wearer's eye which preferably has said second internal surface which is plane and a second opposite external surface,
said at least one pair of said first and second wafers being adapted to impart given prescription data to said optical device via an optical correction provided by said lenses, including optical power, astigmatism and/or addition.

20. The optical device according to claim 19, wherein said at least one pair of said first and second wafers are respectively designed to form:
  said front ophthalmic lens which has a first internal surface which is plane and a first opposite external surface which is convex, and
  said back ophthalmic lens which has a second internal surface which is plane and a second opposite external surface.

21. The optical device according to claim 18, wherein the optical device comprises:
  said first said peripheral sealing arrangement between and in non-adhesive contact with the first said peripheral area of said first internal surface and with the first said zone of said first main face facing said first peripheral area, and/or
  said second said peripheral sealing arrangement between and in non-adhesive contact with the second said peripheral area of said second internal surface and with the second said zone of said second main face facing said second peripheral area.

22. A head-mounted device configured to provide an informative display of augmented reality for a wearer, wherein the head-mounted device comprises an optical device according to claim 1.

23. The head-mounted device according to claim 22, wherein the head-mounted device is adapted to a wearer's prescription data including optical power, astigmatism and/or addition, by means of at least one pair of two first and second said wafers forming ophthalmic lenses with an optical correction arranged on either side of said light conducting element and separated therefrom, with non-adhesive contact, by a first said peripheral sealing arrangement and by a second said peripheral sealing arrangement.

24. The head-mounted device according to claim 22, wherein the head-mounted device comprises a microdisplay projector (POD) embedded into a frame thereof and forming said light source to which said light conducting element is coupled.

* * * * *